United States Patent [19]

Amemori et al.

[11] 4,448,166
[45] May 15, 1984

[54] OVERHEAD CAM TYPE DIESEL ENGINE

[75] Inventors: Koichi Amemori; Toshihiko Kawabe, both of Takatsuki, Japan

[73] Assignee: Yanmar Diesel Engine Co., Ltd., Osaka, Japan

[21] Appl. No.: 325,763

[22] Filed: Nov. 30, 1981

[30] Foreign Application Priority Data

Nov. 28, 1980 [JP] Japan ................ 55-169688[U]
Nov. 28, 1980 [JP] Japan ................ 55-169691[U]

[51] Int. Cl.³ ............... F02M 39/02; F02M 59/20; F02D 1/02
[52] U.S. Cl. .................... 123/445; 123/364; 123/90.27; 123/90.39; 123/446; 239/88
[58] Field of Search ............ 123/90.27, 90.39, 445, 123/510, 90.17, 90.33, 364, 507, 508, 446

[56] References Cited

U.S. PATENT DOCUMENTS

| | | | |
|---|---|---|---|
| 2,159,863 | 5/1939 | Schilling | 123/445 |
| 2,865,361 | 12/1958 | Leach | 123/90.33 |
| 3,139,870 | 7/1964 | Sampietro | 123/90.27 |
| 3,173,407 | 3/1965 | Sampietro et al. | 123/41.81 |
| 3,672,343 | 6/1972 | Biechl et al. | 123/364 |
| 4,036,196 | 7/1977 | Hamilton | 123/364 |
| 4,182,289 | 1/1980 | Nakajima et al. | 123/90.39 |
| 4,263,881 | 4/1981 | Isobe et al. | 123/364 |
| 4,335,686 | 6/1982 | Herdin et al. | 123/90.6 |

FOREIGN PATENT DOCUMENTS

| | | | |
|---|---|---|---|
| 2919213 | 11/1980 | Fed. Rep. of Germany | 123/90.27 |
| WO81/01593 | 6/1983 | PCT Int'l Appl. | 123/90.39 |

OTHER PUBLICATIONS

The Publication entitled: "The Mechanical Principles of Cummins Diesel Engines", Cummins Engine Company, (no date given), (pp. 17–22).

Primary Examiner—Craig R. Feinberg
Assistant Examiner—David A. Okonsky
Attorney, Agent, or Firm—Armstrong, Nikaido, Marmelstein & Kubovcik

[57] ABSTRACT

A unit injector is disposed on a cylinder head in an oblique state and rocker arms for actuating intake and exhaust valves, respectively, are disposed on both sides of the unit injector. Another rocker arm for actuating the unit injector is disposed between these two rocker arms. Support beds for supporting a rocker arm shaft that supports both rocker arms for actuating the intake and exhaust valves and another rocker arm shaft that supports the rocker arm for actuating the unit injector are formed as a unitary structure. One cam shaft for operating the rocker arms for actuating the intake and exhaust valves and the rocker arm for actuating the unit injector is disposed at a low position on the side of the unit injector as close as possible to the axis of a piston. A governor for adjusting the fuel injection quantity of the unit injector is fitted to one end of the cam shaft, in which the arrangement is such that the governor is operatively associated with a control rod disposed parallel to the crank shaft, which rod is operable in association with each unit injector to adjust the fuel injection quantity.

3 Claims, 9 Drawing Figures

OVERHEAD CAM TYPE DIESEL ENGINE

BACKGROUND OF THE INVENTION

1. Field of the Invention

This invention relates to an overhead cam type diesel engine and more particularly, to an overhead cam type diesel engine incorporating unit injectors, which is compact and light in weight, has a simplified construction and is easy to assemble and easy to adjust.

2. Description of the Prior Art

In a prior art diesel engine making use of the so-called unit injector comprising integrally assembled fuel injection pump and fuel injection valve, the unit injector must be disposed on the cylinder head. The construction of the cylinder head becomes unavoidably complicated and the engine size cannot be reduced easily. In particular, since the unit injector is mounted onto the cylinder head, mechanisms for a fuel injection system and intake-exhaust systems including a rocker arm for actuating the unit injector and those for actuating intake and exhaust valves must be arranged in a complicated manner. Moreover, a link mechanism for interlocking a device for regulating the fuel injection quantity of the unit injector with the unit injector, or the like, must also be provided. For these reasons, it has been difficult to obtain a compact engine. Besides, the number of steps on an assembly line necessarily has to be relatively large, and it also has been troublesome to carry out assemblage and adjustment at the time of an overhaul.

Further, a large number of mechanical components or parts as exemplified by the rocker arms for actuating the intake and exhaust valves and for actuating the unit injector need the feed of a lubricant and hence, a large number of lubricant paths must be provided.

OBJECTS OF THE INVENTION

To eliminate these drawbacks with the prior art, the present invention is directed to simplify the construction of an overhead cam type diesel engine incorporating a unit injector and to reduce its size and weight.

It is another object of the present invention to facilitate assembly and adjustment of an overhead cam type diesel engine.

It is still another object of the present invention to simplify the lubrication oil system of an overhead cam type diesel engine.

These and other objects and advantages of the present invention will become more apparent from the following description when considered in connection with the accompanying drawings.

SUMMARY OF THE INVENTION

The present invention is characterized by the constructions described below. Each unit injector is disposed on a cylinder head in an oblique state, and inlet (intake) and exhaust valves are disposed so as to slantly face the unit injector. Rocker arms for actuating the intake and exhaust valves are disposed on both sides of the unit injector and another rocker arm for actuating the unit injector is interposed between these two valve rocker arms. A support shaft for supporting the rocker arms for the intake and exhaust valves and a support shaft for supporting a rocker arm for the unit injector are pivoted to support beds, which are formed as a unitary structure. One cam shaft for operating the rocker arms for the intake and exhaust valves and the rocker arm for the unit injector is disposed at a low position on the side of the unit injector as close as possible to the axis of the piston.

The overhead cam type diesel engine in accordance with the present invention is equipped with a governor for adjusting the fuel injection quantity of the unit injector at one end of the cam shaft.

In the present invention, a lubricant path is defined between a cylinder bolt for fixing the support beds to the cylinder head and a cylinder bolt through-hole formed on the cylinder head and is communicated with a lubricant feed path and with a groove defined on the support beds. The lubricant is thus fed from the groove to each rocker arm and to the bearing portion of the cam shaft, thereby integrating the lubricant feed system.

The fuel feed path is positioned above an insertion hole for the inclined unit injector so as to facilitate the withdrawal of the air staying in the proximity of the fuel intake port of the unit injector.

As described, in accordance with the present invention, since the one cam shaft for operating the rocker arms for actuating the intake and exhaust valves and the rocker arm for actuating the unit injector is disposed at a low position on the side of the unit injector as close as possible to the axis of the piston and at the same time, since the rocker arms for actuating the intake and exhaust valves are disposed on both sides of the unit injector, it becomes possible to compactly construct the cylinder head as well as a rocker arm chamber. In consequence, a control rod for controlling the unit injector and the governor can be situated close to the rocker arm chamber and a fuel feed pump can also be disposed close thereto.

According to this arrangment, the rocker arms for both fuel injection system and intake-exhaust system and the governor can be operated by one cam shaft and the unit injector can be disposed close to the governor. Hence, the construction of a governor lever and that of a control rod for interconnecting these members can be simplified.

Because the intake-exhaust system, the fuel injection system and the fuel injection control system can be incorporated in the rocker arm chamber at the upper portion of the cylinder head in accordance with the present invention, assembly and adjustment of these members can be made easily. It also is feasible according to the present invention to set to the cylinder block through the head bolt a cylinder head assembly having tha unit injector, the governor and their connecting control device altogether attached to the cylinder head. In addition, the internal construction of the rocker arm chamber can be simplified, thereby making it possible to reduce the size and weight of the diesel engine as a whole. Also, the number of steps on an assembly line can be greatly reduced.

Furthermore, since the principal sliding portions such as the rocker arms are incorporated in the rocker arm chamber, feed of the lubricant to these sliding members can be made from one lubricant path, simplifying the lubricant system.

DESCRIPTION OF THE PREFERRED EMBODIMENTS

Figure 1:
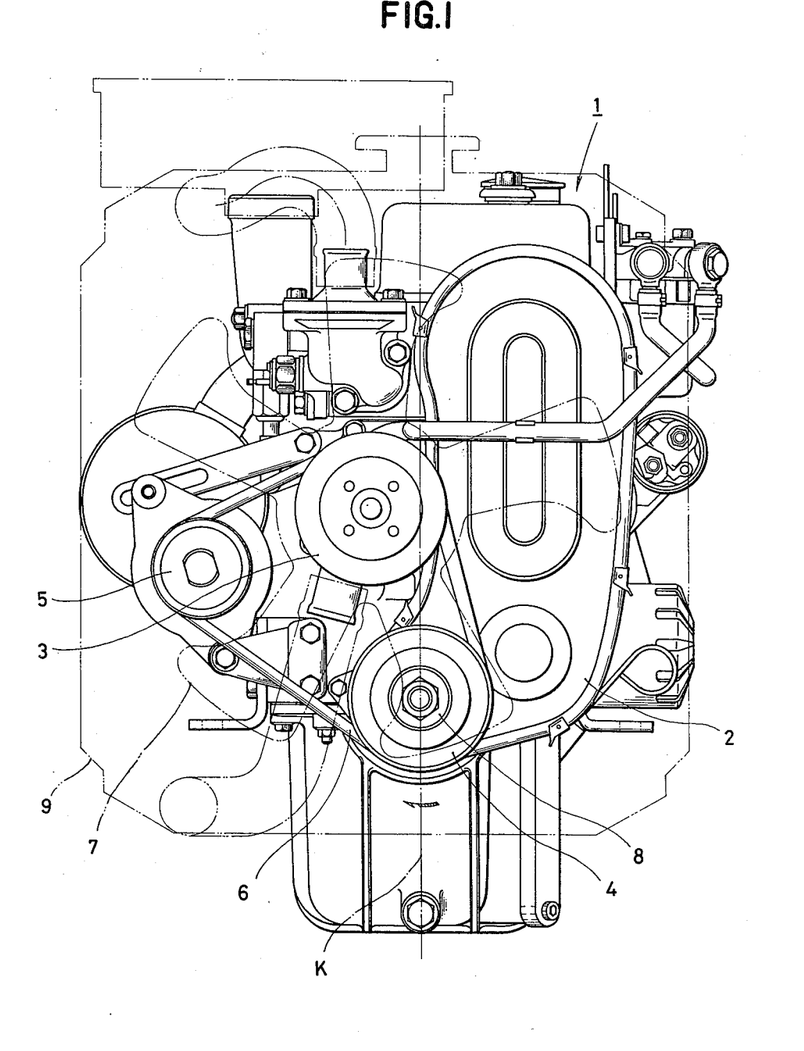
FIG. 1 is a front view of an overhead cam type diesel engine in accordance with the present invention.

FIG. 1 is a front view of an overhead cam type diesel engine 1 in accordance with the present invention. In the front of this engine 1 are compactly arranged a timing belt chamber 2, a fan driving pulley 3, a crank pulley 4 and a generator 5. In the drawing, reference numeral 6 denotes a V belt, 7 is a radiator fan, 8 is a crank shaft and 9 is a radiator.

Figure 2:
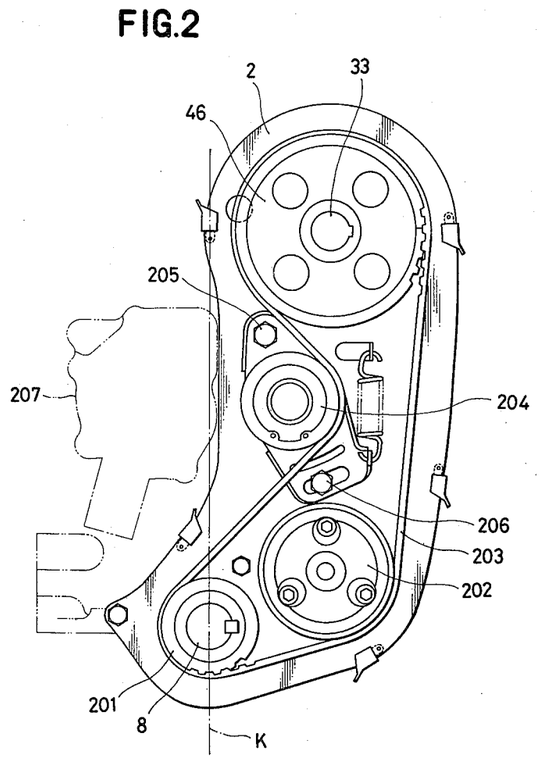
FIG. 2 shows a front view of essential portions within a timing belt chamber in the diesel engine of the present invention.

As shown in FIG. 2, which is a front view showing essential portions within the timing belt chamber 2, there is a timing belt 203 mounted over a crank pulley 201, cam shaft driving pulley 46 and an oil pump driving pulley 202. Tension on the timing belt 203 is adjustable by operating a tensioner 204, which is mounted in the timing belt chamber 2 by means of bolts 205 and 206.

The cam shaft driving pulley 46 is attached to a cam shaft 33, which is disposed at a right side location of a vertical line K passing through the center of the crank shaft 8. The oil pump driving pulley 202 is disposed at a location below the cam shaft 33 and appreciably above the crank pulley 201. Further, the tensioner 204 is disposed at a midway point between the cam shaft driving pulley 46 and the oil pump driving pulley 202.

According to the above arrangement, the timing belt chamber 2 is located at a right side point of the vertical line K, whereby a cooling water pump 207 can be disposed close to the vertical line K and, in addition, the center of the radiator 9 can be so disposed as to lie close to the center of the cylinder, so that the entire width of a front portion of the engine can be reduced.

Figure 4:
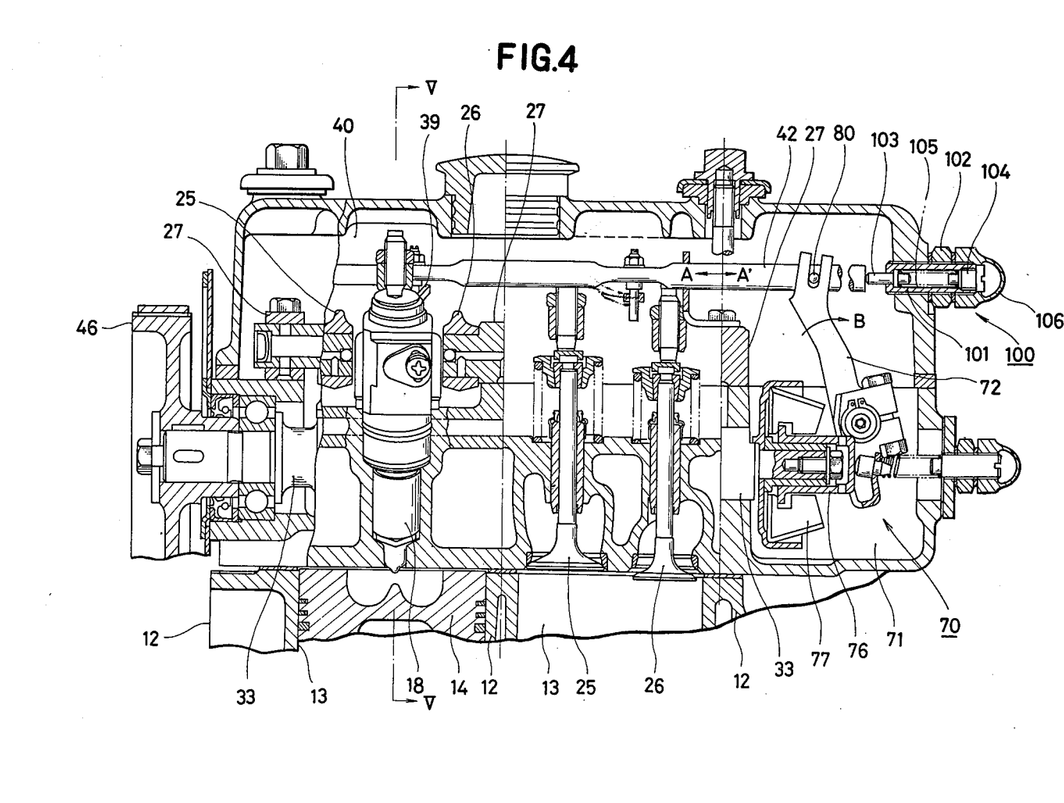
FIG. 4 is a sectional view taken along line IV—IV of FIG. 3.

In the diesel engine 1, a piston 14 is permitted to reciprocate inside a cylinder 13, as shown in FIG. 4. A water jacket 15a is disposed on the upper half portion of a cylinder line 16, and another water jacket 15b is provided to the cylinder head 11. These water jackets 15a and 15b provide the advantages that over-cooling can be prevented during idling of the engine and the weight of a cylinder block 12 itself can be reduced. It also is devised such that the radiator 9 is located below the engine so that a lower half portion of the engine provided with no cooling system can be cooled through the water jackets 15a and 15b, whereby the volume of the radiator 9 can be reduced.

A cylinder head 11 of a structure having a unit injector 18, a governor 70 and their connecting control device altogether connected thereto, is fixed onto the cylinder block 12 by means of bolts that will later be described. A glow plug 20 and a unit injector 18 are disposed on the cylinder head 11 so as to depict a substantially V-like shape with each other. The tips of the glow plug 20 and unit injector 18 are somewhat eccentric with respect to the center of the cylinder 13 and face a combustion chamber 17 disposed at the top of the piston 18. The unit injector 18 is composed of a fuel injection pump and a fuel injection nozzle.

Figure 3:
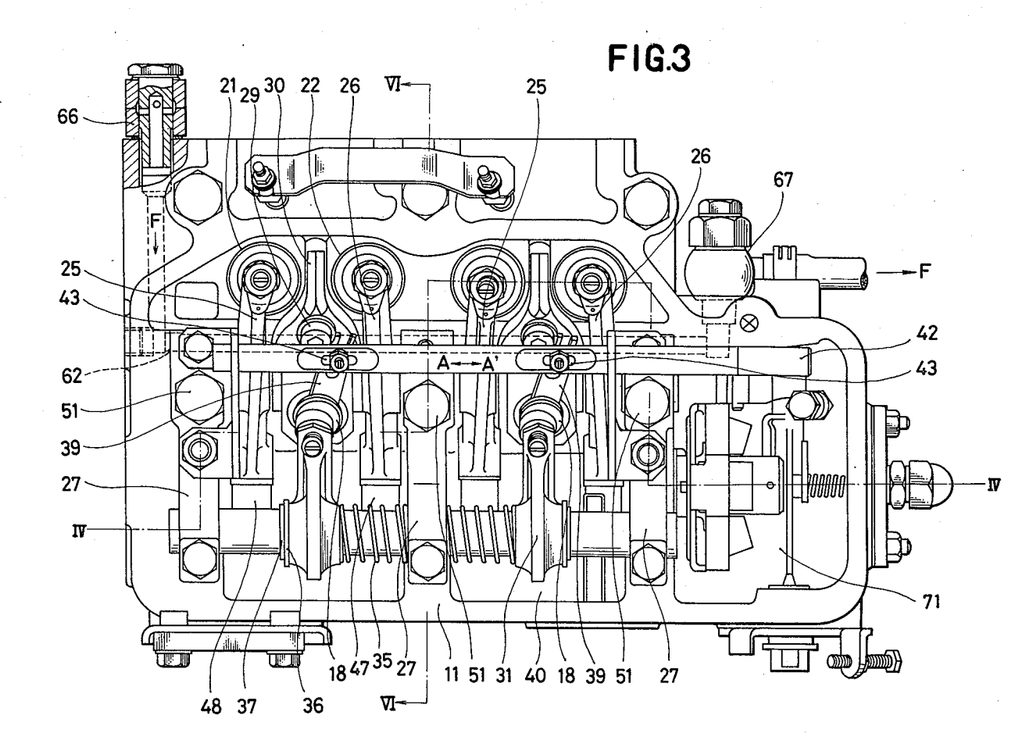
FIG. 3 is a plan view, partly in section, showing the interior of the rocker arm chamber of the diesel engine of the present invention.

As depicted in FIG. 3, intake and exhaust valves 21 and 22 are arranged so as to obliquely face the unit injector 18. The intake valve 21 is actuated by a rocker arm 25 and the exhaust valve 22, by a rocker arm 26. Support beds 27 are disposed outside these rocker arms 25 and 26, respectively. As can be understood from FIG. 4, these support beds 27 are positioned on the walls of the cylinder block 12 that interpose the cylinder 13. A rocker arm shaft 28 is disposed on each support bed 27 in order to support the rocker arms 25 and 26 in the cantilever arrangment.

Figure 7:
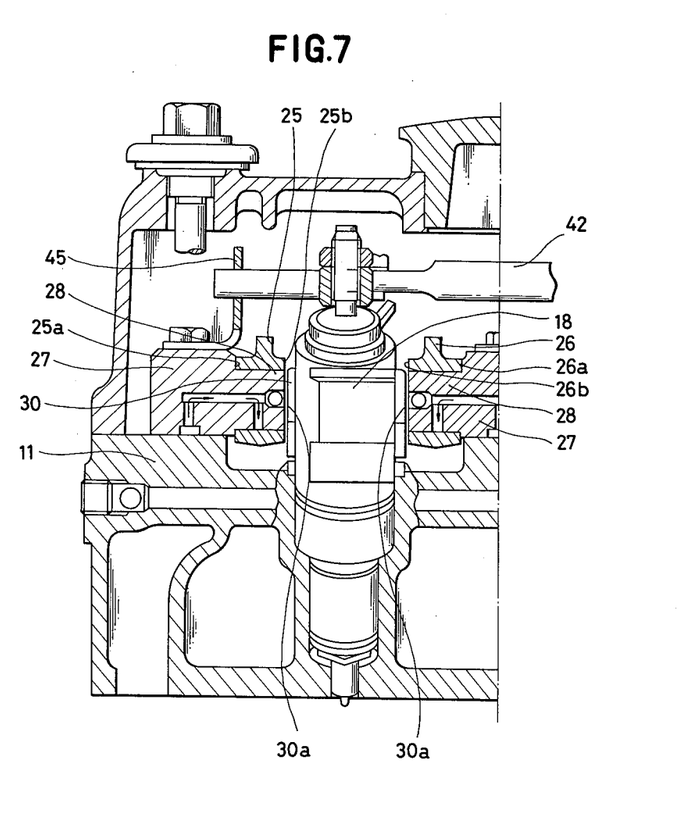
FIG. 7 is a sectional view showing the support state of rocker arms for intake and exhaust.

Accordingly, the internal surface 25a of the rocker arm 25 and internal surface 26a of the rocker arm 26 are located on the side surfaces of the support bed 27, respectively. The external surface 25b of the rocker arm 25 and external surface 26b of the rocker arm 26 are located respectively by the side surface 30a of a keep member 30 for fixing the unit injector 18 (FIG. 7). This keep member 30 is in turn fixed to the cylinder head 11 by means of a bolt 29 (FIG. 3). It may alternatively be devised to let the rocker arms 25 and 26 be secured by the unit injector 18.

The unit injector 18 can be inspected or replaced by removing first the keep member 30 and moving a rocker arm 31 for actuating the unit injector 18, in the axial direction of a rocker arm shaft 32. In this case, the rocker arms 25 and 26 and the support bed 27 need not be removed. This results in the advantage that the inspection or replacement of the unit injector 18 can be made easily.

Figure 6:
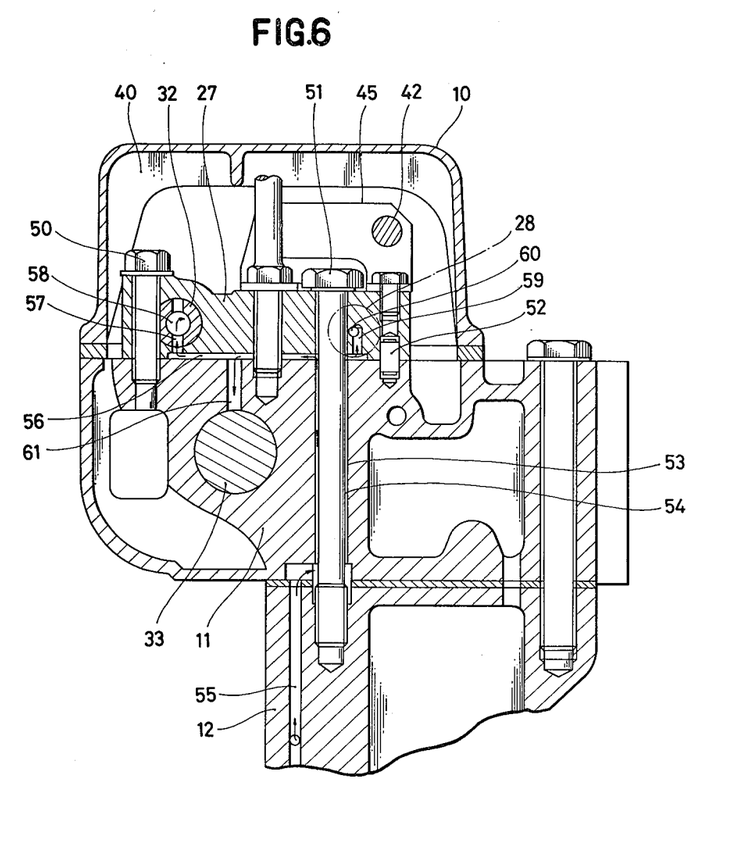
FIG. 6 is a sectional view taken along line VI—VI of FIG. 3.

The rocker arm shaft 32 is fitted to the support bed 27 in such a manner as to be parallel to the rocker arm shaft 28, as shown in FIG. 6. This makes it possible to assemble the rocker arm shafts 28 and 32 with a high level of accuracy.

The rocker arm 31 is pivoted to the rocker arm shaft 32 so as to be capable of rocking. The rocker arm 31 rocks while coming into contact with a cam 34 of a cam shaft 33 that is supported by the cylinder head 11, and injects the fuel from the unit injector 18 whenever it rocks. The rocker arm 31 is fitted to the rocker arm shaft 32 so as to be capable of moving in its axial direction. As shown in FIG. 3, a coiled spring 35 under the compressed state is interposed in one of the gaps between the rocker arm 31 and the support bed 27 while a stopper 37 is disposed in the other via a washer 36. This stopper 37 is detachably fitted to the rocker arm shaft 32 and locates the rocker arm 31. The rocker arm 31 is moved against the resiliency of the spring 35 for removing the unit injector 18.

Figure 5:
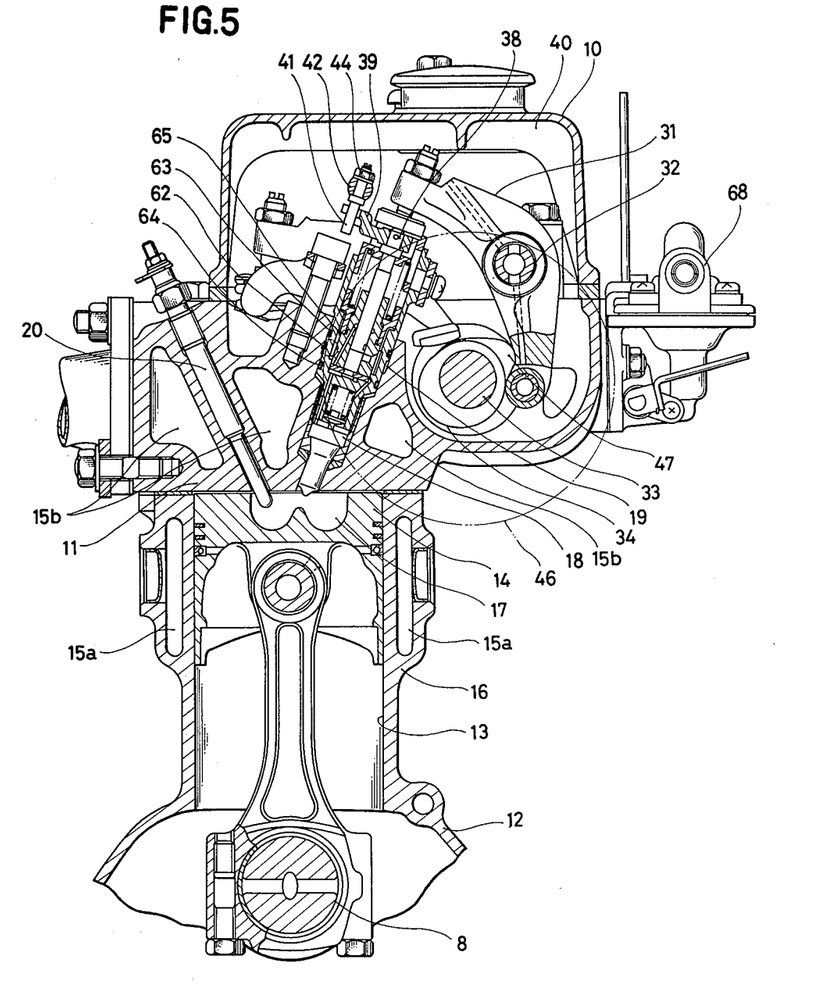
FIG. 5 is a sectional view taken along line V—V of FIG. 4.

A fork-shaped lever 39 is fitted to a plunger 38 of each unit injector 18 as shown in FIGS. 3, 4, and 5 so that the fuel injection quantity can be adjusted by rotating this fork-shaped lever 39. The lever 39 engages with a pin 41 that is fitted to a control rod 42. As shown in FIG. 3, an elongated hole 43 is bored on this control lever 42. The pin 41 is inserted into this elongated hole 43 and is fastened by a nut 44. Accordingly, the fuel injection quantity of each unit injector 18 can be equalized by adjusting in advance this pin 41 to the position controlled for each unit injector. The control rod 42 is supported by a support member 45 that is fixed onto the support bed 27, in a slidable manner parallel to the crank shaft.

As depicted in FIG. 5, the cam shaft 33 is disposed at the lower portion of the unit injector 18 as close as possible to the axis of the cylinder 13. According to this arrangment, the lengths of the rocker arms 25 and 26 for the intake and exhaust valves and rocker arm 31 for the unit injector 18 can be reduced, thereby improving the follow-up characteristic in high speed revolution. It also provides the advantage that a rocker arm chamber 40 encompassed by the cylinder head 13 and by a bonnet 10 can be rendered more compact. In addition, the total height of the diesel engine can be reduced because a pulley 46 disposed at the end of the cam shaft 33 does not protrude beyond the bonnet 10. Since the cam shaft 33 is situated close to the axis of the cylinder 13, the width of the rocker arm chamber 40 and eventually, the total width of the engine, can be reduced. In FIG. 3, reference numeral 47 represents a cam for actuating the exhaust rocker arm 26, and 48 represents a cam for actuating the intake rocker arm 25.

As illustrated in FIG. 6, the support bed 27 is fixed to the cylinder head 11 by a bolt 50 and at the same time, is fixed to the cylinder block 12 together with the cylinder head 11 by a head bolt 51. A knock pin 52 is employed in order to secure the accuracy of its location. As shown in FIG. 3, the head bolt 51 is so disposed as not to interfere with the control rod 42 when it is pulled out. A cylinder through-hole 53 is defined on the cylinder head 11 and the head bolt 51 penetrates through this through-hole. The through-hole 53 has a larger diameter than that of the head bolt 51 to define a circular gap, which is used as a lubricant path 54. The lower part of this lubricant path 54 communicates with a lubricant feed path 55 that is defined in the cylinder block 12. The upper part of the lubricant path 54 communicates with a groove 56 defined on the lower surface of the support bed 27. This groove 56 communicates with a lubricant path 58, defined in the rocker arm shaft 32, via an aperture 57. A lubricant is fed to the bearing portion of the rocker arm 31 for actuating the fuel injection valve, past through the lubricant path 58. The groove 56 communicates with a lubricant path 60 via an aperture 59 and the lubricant is fed through this lubricant path 60 to the bearing portions of the rocker arms 25 and 26 for actuating the intake and exhaust valves. Still another lubricant path 61 is formed on the cylinder head 11 in fluid communication with the bearing portion of the cam shaft 33 from the abovementioned groove 56 so that the lubricant is fed from the groove 56 to the cam shaft 33.

Since the lubricant of the same system can be fed to the bearing portions of the rocker arms 25 and 26 for actuating the intake and exhaust valves, to the bearing portion of the rocker arm 31 for actuating the unit injector 18 and to the cam shaft 33, the oil feed system can be advantageously simplified.

As illustrated in FIG. 3, a fuel feed path 62 is disposed on the cylinder head 11 in parallel to the crank shaft or to the cam shaft 33. As shown in FIG. 5, this fuel feed path 62 extends through the cylinder head 11 so as to be positioned on the upper surface of an insertion hole 19 that is slantly disposed for fitting the unit injector. Accordingly, it can be effectively checked that air is permitted to stay in the unit injector 18. A fuel intake port 63 of the unit injector 18 opens to this fuel feed path 62. O-rings 64 and 65 are disposed above and below the fuel intake port 63 on the unit injector 18 for sealing the insertion hole 19.

A solenoid valve 66, that is open only when the engine is operated, is disposed at the inlet of the fuel feed path 62. A check valve 67 is disposed at its outlet in order to adjust the pressure of the fuel F inside the fuel feed path 62. According to this arrangement, even if the air stays around the opening of the fuel intake port 63 of the unit injector after engine stops, the air can simply be returned into the fuel tank together with the fuel when the engine is started for operation. Reference numeral 68 represents a fuel feed pump.

As shown in FIG. 4, the cam shaft 33 is equipped with a timing belt pulley 46 at one of its end and with a governor 70 at the other. Inside a governor chamber 71 accommodating therein the governor 70, a governor lever 72 is turnably supported in the interlocking arrangement with the operation of the governor 70. The rotation of this governor lever 72 permits the control rod 42 to reciprocate in the direction indicated by an arrow A, thereby adjusting the fuel injection quantity of the unit injectors 18.

Figure 8:
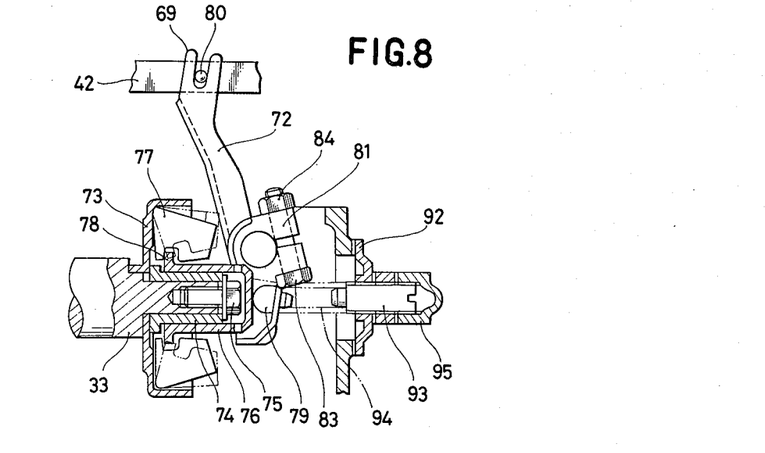
FIG. 8 is a sectional view of a governor.
Figure 9:
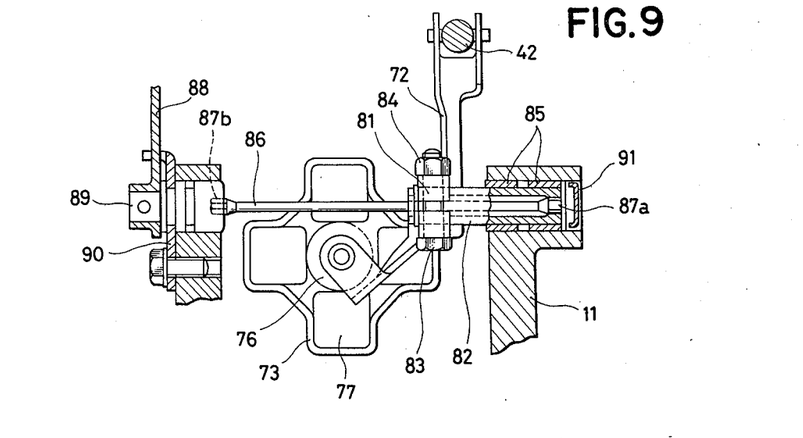
FIG. 9 is a front view of the governor.

The governor 70 will be described in further detail. As depicted in FIGS. 8 and 9, a governor housing 73 is mounted to the cam shaft 33. The governor housing 73 is fixed by a governor housing support 74 and a bolt 75 that is screwed to the end of the cam shaft 33. A governor weight 77 is disposed inside the governor housing 73. The governor weight 77 is anchored by a flange 78 of a governor spindle 76 that is slidably fitted to the governor housing support 74.

A butting metal 79 fitted to one end of the governor lever 72 is brought into constant contact with the end surface of the governor spindle 76. The other end 69 of the governor lever 72 is bifurcated and engages with a pin 80 fixed to the control rod 42. The intermediate portion of the governor lever 72 is fixed to an open end portion of a cylindrical bottomed support member 82. In other words, the open end portion of the support member 82 is embraced by two split clamp portions 81 disposed in the proximity of the center of revolution of the governor lever and is firmly fixed by bolt and nut 83 and 84 that are fitted to the support member 82. The support member 82 is turnably disposed on the cylinder head 11 via bearing 85. The reference numeral 86 represents a bar-like torsion bar having high toughness, whose one end is fixed to the bottom of the support member 82 via a fitting portion 87a and whose other end is fixed to a shaft 89 of a regulator handle 88 that is disposed on the cylinder head 11 via a fitting member 87b. The reference numeral 90 denotes a torsion bar support and reference numeral 91 represents a blind plug that covers the external end portion of the bearing 85.

As shown in FIG. 8, an idle support 92 is fixed to the cylinder head 11 and an idle adjusting screw 93 is screwed to this idle support 92. An idle spring 94 is interposed under the compressed state between the idle adjusting screw 93 and the back of the butting metal 79. The head of the idle adjusting screw 92 is covered with a box nut 95.

Since the torsion bar 86 itself has spring force as described above, a spring for urging the governor lever 72 is not necessary, simplifying the construction of the governor 70. Since the torsion bar as a whole has a relatively great length, a spring constant can be reduced and its sensitivity can be improved. As a result, the operating angle of the regulator handle can be increased and maneuverability can be improved.

Further, a torque spring device 100 is disposed on the bonnet 10 so as to correspond to the end surface of the control rod 42. This torque spring device 100 limits the fuel injection under the steady state, increases the fuel injection quantity when the number of revolution drops below that under the steady state and increase the fuel injection quantity at the start of operation.

The main frame 101 of the torque spring device is screwed to the bonnet and after set in place, is fixed by nuts 102. A pin 103 is fitted to the tip of this main frame 101 and an adjusting screw 104 is screwed to the rear end portion of the main frame. A spring 105 is interposed between these two members 103 and 104 so that the urging force of the spring 105 can be adjusted by rotating the adjusting screw 104. The projecting end portion of the main frame 101 is covered with a box nut 106.

While the above-mentioned diesel engine is operated under the steady state, the control rod 42 is situated at a position shown in FIG. 4 and the tip of the control rod 42 butts against the pin 103 of the torque spring device 100. Since the pin 103 is urged by the spring 105, however, the control rod 42 does not move in the direction shown by A' any more so that the fuel injection quantity of the unit injector is kept constant.

When the number of revolution of the diesel engine drops, the operating force of the governor weight 77 becomes smaller so that the governor lever 72 is rotated in the direction indicated by an arrow B by the spring force of the torsion bar 86 and moves the control rod 42 in the direction of the arrow A', thereby increasing the fuel injection quantity of the unit injector 18.

At the start of the operation of the diesel engine, the governor 70 exerts almost no force or only an appreciable degree of force, if any, so that by rotating the regulator handle 88 in the direction indicated by the arrow B, all the force of the torsion bar 86 is applied to the torque spring 105 to shift the control rod 42 in the direction of the arrow A', whereby the engine is started with the fuel injection quantity of the unit injector 18 increased beyond the quantity at the time of the rated rotation.

What is claimed is:

1. An overhead cam type diesel engine, comprising:
   unit injectors mounted on a cylinder head in an oblique arrangement relative to an axes of cylinder,
   a rocker arm for actuating an intake valve and another rocker arm for actuating an exhaust valve, disposed on one and another side of each unit injector,
   a further rocker arm for actuating the unit injector, disposed between said rocker arm and said another rocker arm,
   a single cam shaft disposed parallel with a crankshaft for actuating said rocker arm, said another rocker arm and said further rocker arm,
   a rocker arm shaft disposed parallel with said cam shaft, said further rocker arm being supported on said rocker arm shaft in a rockable manner and also in a slidable manner in an axial direction of rocker arm shaft,
   a pair of support beds disposed in a manner of interposing said rocker arm and said another rocker arm between them and thereon securely supporting said rocker arm shaft,
   two shafts respectively projected from said support beds toward a vicinity of said unit injector, said rocker arm and said another rocker arm being rockably supported on one and another of said two shafts said unit injectors are each provided with a plunger for adjusting a fuel injection quantity and a fork-shaped lever secured to said plunger, said fork-shaped lever engaging a pin mounted parallel with the unit injectors, on a control rod disposed parallel with the crankshaft.

2. An overhead cam type diesel engine as claimed in claim 1, wherein said cylinder head is formed with insertion holes for therein receiving said unit injectors inclined relative to the axes of cylinder, said unit injectors each having a fuel intake port, said cylinder head having a fuel feed path positioned on an upper surface of the insertion holes and in communication with said fuel intake port of the unit injector received in said insertion holes.

3. An overhead cam type diesel engine, comprising:
   a rocker arm for actuating an intake valve, another rocker arm for actuating an exhaust valve and a further rocker arm for actuating an injector, disposed between said rocker arm and said another rocker arm,
   a single cam shaft disposed parallel with a crankshaft for actuating said rocker arm, said another rocker arm and said further rocker arm,
   a control rod disposed parallel with said cam shaft and capable of being reciprocated in an axial direction of the cam shaft,
   a governor mounted at one end of said cam shaft,
   a governor lever disposed in a vicinity of said governor and pressed at its one end by an end face of the governor and engaging at its other end with a pin secured to said control rod,
   a cylindrical support member secured at an intermediate portion of said governor lever in a perpendicular arrangement to the lever, and
   a torsion bar having a torsion spring force, fixed with its one end to an end face of said cylindrical support member and with its other end to a shaft of a regulator handle.

* * * * *